US011955264B2

(12) United States Patent
Sakai

(10) Patent No.: US 11,955,264 B2
(45) Date of Patent: Apr. 9, 2024

(54) COIL COMPONENT

(71) Applicant: Murata Manufacturing Co., Ltd., Kyoto-fu (JP)

(72) Inventor: Takashi Sakai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 663 days.

(21) Appl. No.: 16/929,280

(22) Filed: Jul. 15, 2020

(65) Prior Publication Data

US 2021/0035724 A1 Feb. 4, 2021

(30) Foreign Application Priority Data

Jul. 31, 2019 (JP) ................................ 2019-141339

(51) Int. Cl.
*H01F 17/00* (2006.01)
*H01F 5/00* (2006.01)
*H01F 27/29* (2006.01)

(52) U.S. Cl.
CPC ......... *H01F 17/0013* (2013.01); *H01F 5/003* (2013.01); *H01F 27/292* (2013.01); *H01F 2017/0066* (2013.01)

(58) Field of Classification Search
CPC ............. H01F 17/0013; H01F 17/0006; H01F 27/2804; H01F 2027/2809; H01F 5/003; H01F 27/292; H01F 2017/0066
USPC ................................................. 336/200, 232
See application file for complete search history.

(56) References Cited

U.S. PATENT DOCUMENTS

2010/0225437 A1* 9/2010 Ueda ....................... H01F 17/04 336/200
2012/0326827 A1* 12/2012 Nanjyo ............... H01F 17/0033 336/200

FOREIGN PATENT DOCUMENTS

JP 08064421 A * 3/1996
JP 2003-347122 A 12/2003
JP 2005294725 A * 10/2005 ......... H01F 17/0013
JP 2015070172 A * 4/2015
JP 2015-191904 A 11/2015
JP 2017-059749 A 3/2017
WO WO-2007072617 A1 * 6/2007 ......... H01F 17/0013

OTHER PUBLICATIONS

An Office Action; "Notice of Reasons for Refusal," mailed by the Japanese Patent Office dated Mar. 29, 2022, which corresponds to Japanese Patent Application No. 2019-141339 and is related to U.S. Appl. No. 16/929,280 with English language translation.

* cited by examiner

*Primary Examiner* — Tszfung J Chan
(74) *Attorney, Agent, or Firm* — Studebaker & Brackett PC

(57) ABSTRACT

A coil component includes an element and a coil disposed in the element. The element includes a plurality of first magnetic layers and second magnetic layers laminated. The coil includes a plurality of coil conductive layers laminated. Each of the coil conductive layers is disposed between a corresponding one of the first magnetic layers and a corresponding one of the second magnetic layers. A pore area proportion in the second magnetic layers is smaller than a pore area proportion in the first magnetic layers. A void is present between the coil conductive layer and the corresponding one of the second magnetic layers.

20 Claims, 7 Drawing Sheets

COIL COMPONENT

CROSS-REFERENCE TO RELATED APPLICATION

This application claims benefit of priority to Japanese Patent Application No. 2019-141339, filed Jul. 31, 2019, the entire content of which is incorporated herein by reference.

BACKGROUND

Technical Field

The present disclosure relates to a coil component.

Background Art

An example of known coil components is described in Japanese Unexamined Patent Application Publication No. 2017-59749. That coil component includes an element and a coil disposed in the element. The coil includes a plurality of coil conductive layers laminated. Stress relaxation spaces in contact with surfaces of the coil conductive layers are disposed in the element. Powder of zirconium dioxide ($ZrO_2$) is present in the stress relaxation spaces.

To actually manufacture the above-described known coil component, paste containing the $ZrO_2$ powder is applied on the coil conductive layers formed on ceramic green sheets by screen-printing or other method, and powder patterns to become the stress relaxation spaces are formed. After that, the powder patterns are fired, thereby forming the stress relaxation spaces. Because it is necessary to print the patterns of $ZrO_2$ paste or other material on the coil conductive layers, the process may be complicated.

SUMMARY

Accordingly, the present disclosure can provide a coil component in which voids can be readily formed.

According to a preferred embodiment of the present disclosure, a coil component includes an element and a coil disposed in the element. The element includes a plurality of first magnetic layers and second magnetic layers laminated. The coil includes a plurality of coil conductive layers laminated. Each of the coil conductive layers is disposed between a corresponding one of the first magnetic layers and a corresponding one of the second magnetic layers. A pore area proportion in the second magnetic layers is smaller than a pore area proportion in the first magnetic layers. A void is present between the coil conductive layer and the corresponding one of the second magnetic layers.

Here, the pore area proportion indicates the proportion of the area of pores (cavities) per unit area in a predetermined region at a cross section of the element.

According to the above-described the preferred embodiment, the pore area proportion in the second magnetic layers being smaller than that in the first magnetic layers means that the amount of a binder for forming the pores in the second magnetic layers is smaller than that in the first magnetic layers. Because the binder contributes to the adhesion and the amount of the binder is different as described above, the adhesion between the coil conductive layer and the corresponding second magnetic layer is lower than that between the coil conductive layer and the corresponding first magnetic layer. At the time of firing, the binder is being lost, the pores are being formed, and the coil conductive layer starts shrinking from its portion in contact with the second magnetic layer, which has low adhesion. Consequently, voids open between the coil conductive layer and the second magnetic layer. Accordingly, the voids can be readily formed.

In the coil component according to an aspect of the preferred embodiment, a difference between the pore area proportion in the first magnetic layers and the pore area proportion in the second magnetic layers may preferably be about 2% or more.

According to the above aspect, because the difference between the pore area proportion in the first magnetic layers and that in the second magnetic layers is about 2% or more, the adhesion between the coil conductive layer and the corresponding second magnetic layer can be lower than that between the coil conductive layer and the corresponding first magnetic layer with reliability, and the voids can be formed more readily.

In the coil component according to another aspect of the preferred embodiment, the difference between the pore area proportion in the first magnetic layers and the pore area proportion in the second magnetic layers may preferably be about 5% or more.

According to the above aspect, because the difference between the pore area proportion in the first magnetic layers and that in the second magnetic layers is about 5% or more, the adhesion between the coil conductive layer and the corresponding second magnetic layer can be lower than that between the coil conductive layer and the corresponding first magnetic layer with reliability, and the voids can be formed more readily.

In the coil component according to another aspect of the preferred embodiment, the pore area proportion in the second magnetic layers may preferably be not less than about 1% and not more than about 5% (i.e., from about 1% to about 5%).

In the coil component according to another aspect of the preferred embodiment, the pore area proportion in the first magnetic layers may preferably be not less than about 5% and not more than about 15% (i.e., from about 5% to about 15%).

In the coil component according to another aspect of the preferred embodiment, the coil component may preferably further include an outer electrode disposed on a surface of the element and electrically connected to the coil. The coil may preferably include an extended conductive layer electrically connected to the coil conductive layer, exposed through the surface of the element, and connected to the outer electrode. The extended conductive layer may preferably be disposed on a layer different from the layer on which the coil conductive layer is disposed.

According to the above aspect, because the extended conductive layer is disposed on the layer different from the layer on which the coil conductive layer is disposed, the extended conductive layer is not in contact with the voids. Therefore, the voids do not communicate with the outside of the element, and entry of plating solution or other matter from the outside of the element can be prevented.

In the coil component according to another aspect of the preferred embodiment, the extended conductive layer may preferably be disposed between two of the second magnetic layers.

According to the above aspect, because the extended conductive layer is disposed between the two second magnetic layers, the number of the pores is small around the extended conductive layer. Therefore, the pores do not communicate with the outside of the element, and entry of plating solution or other matter from the outside of the element can be prevented.

In the coil component according to the preferred embodiments of the present disclosure, the voids can be readily formed.

Other features, elements, characteristics and advantages of the present disclosure will become more apparent from the following detailed description of preferred embodiments of the present disclosure with reference to the attached drawings.

DETAILED DESCRIPTION

A coil component according to preferred embodiments of the present disclosure is described in detail below with reference to illustrated embodiments. The drawings include schematic ones in part and may not reflect real dimensions or ratios.

First Embodiment

Figure 1:
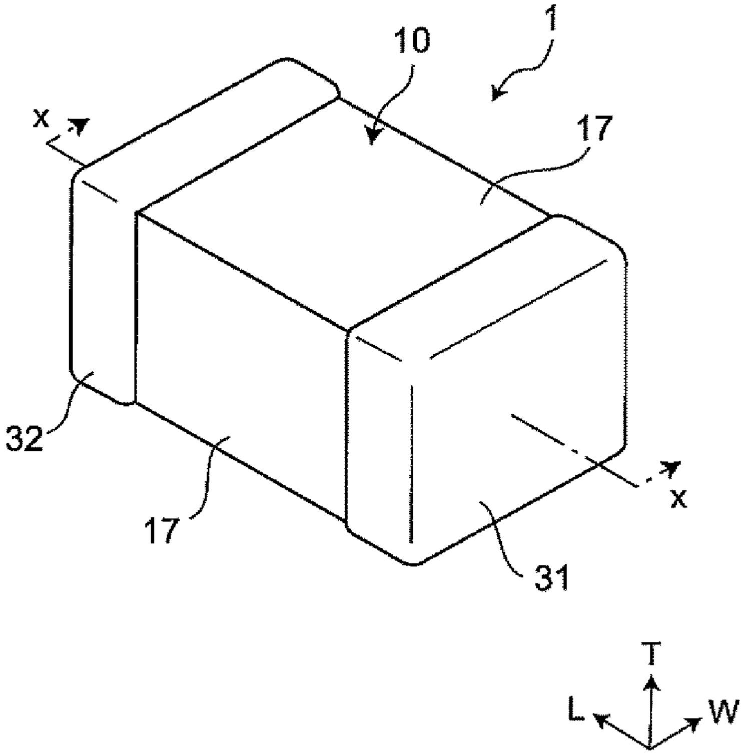
FIG. 1 is a perspective view that illustrates a coil component according to a first embodiment.
Figure 2:
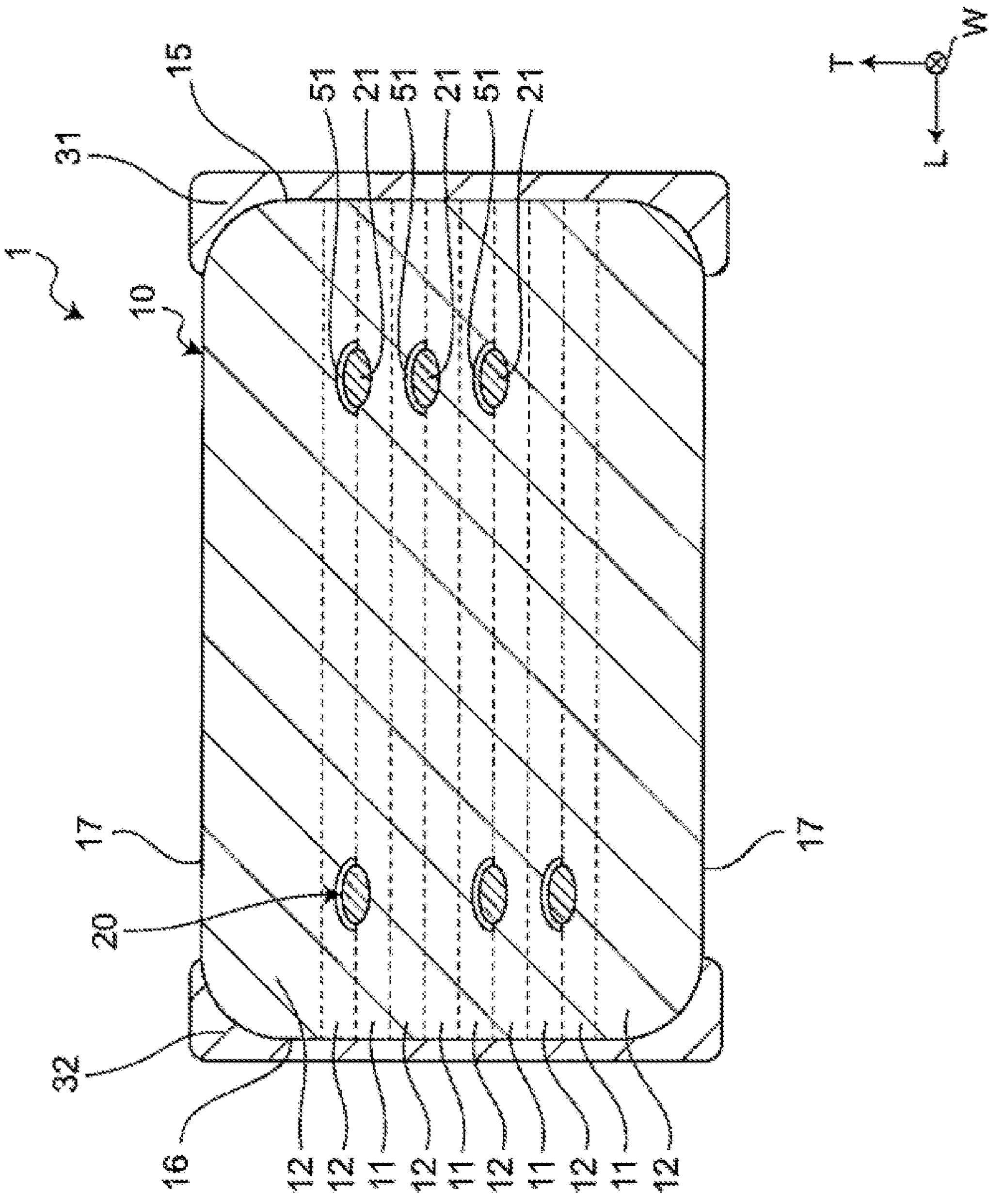
FIG. 2 is a cross-sectional view of the coil component taken along X-X in FIG. 1.
Figure 3:
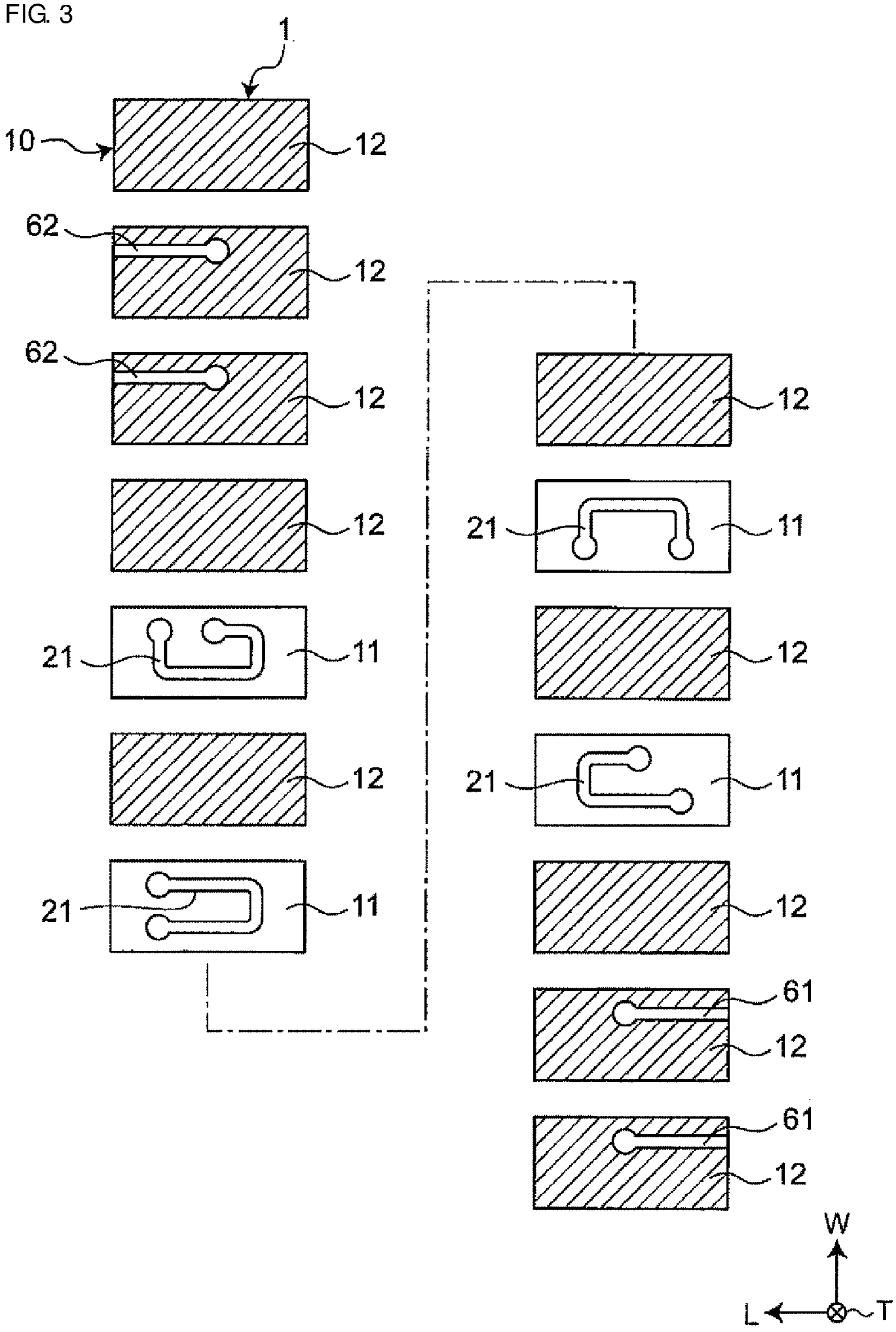
FIG. 3 is an exploded plan view of the coil component.

FIG. 1 is a perspective view that illustrates a coil component according to a first embodiment. FIG. 2 is a cross-sectional view of the first embodiment taken along X-X in FIG. 1 and is an LT cross-sectional view passing through the substantially center in a W direction. FIG. 3 is an exploded plan view of the coil component and includes illustrations along a T direction from the bottom to the top. The L direction is the longitudinal direction of a coil component 1, the W direction is the width direction of the coil component 1, and the T direction is the height direction of the coil component 1.

As illustrated in FIG. 1, the coil component 1 includes an element 10, a coil 20 (see FIG. 2) disposed inside the element 10, and a first outer electrode 31 and a second outer electrode 32, which are disposed on a surface of the element 10 and are electrically connected to the coil 20.

The coil component 1 is electrically connected to wiring on a circuit board (not illustrated) with the first and second outer electrodes 31 and 32 interposed therebetween. The coil component 1 may be used as, for example, a noise reduction filter and can be used in electronic equipment, such as a personal computer, a DVD player, a digital camera, a television, a cellular phone, and car electronics.

The element 10 has the shape of a substantially rectangular parallelepiped. The element 10 has a first end surface 15, a second end surface 16 on the opposite side of the first end surface 15, and four side surfaces 17 between the first end surface 15 and the second end surface 16. The first end surface 15 and the second end surface 16 are opposed in the L direction.

As illustrated in FIG. 2, the element 10 includes a plurality of first magnetic layers 11 and second magnetic layers 12. The first magnetic layers 11 and second magnetic layers 12 are alternately laminated in the T direction. Each of the first magnetic layers 11 and second magnetic layers 12 may be made of, for example, a magnetic material, such as an Ni—Cu—Zn-based ferrite material. One example of the thickness of each of the first magnetic layer 11 and second magnetic layer 12 may be not less than about 5 μm and not more than about 30 μm (i.e., from about 5 μm to about 30 μm). The element 10 may include a non-magnetic layer in part.

The first outer electrode 31 covers the entire surface of the first end surface 15 of the element 10 and end portions of the side surfaces 17 adjacent to the first end surface 15 of the element 10. The second outer electrode 32 covers the entire surface of the second end surface 16 of the element 10 and end portions of the side surfaces 17 adjacent to the second end surface 16 of the element 10. The first outer electrode 31 is electrically connected to a first end of the coil 20. The second outer electrode 32 is electrically connected to a second end of the coil 20.

The first outer electrode 31 may have a substantially L shape extending over the first end surface 15 and one side surface 17. The second outer electrode 32 may have a substantially L shape extending over the second end surface 16 and one side surface 17.

As illustrated in FIGS. 2 and 3, the coil 20 is spirally wound along the T direction. The coil 20 may be made of, for example, a conductive material, such as silver or copper. The coil 20 includes a plurality of coil conductive layers 21 and a plurality of extended conductive layers 61 and 62.

The two first extended conductive layers 61, the plurality of coil conductive layers 21, and the two second extended conductive layers 62 are arranged in sequence in the T direction and are electrically connected in sequence with via conductors interposed therebetween. The plurality of coil conductive layers 21 are connected in sequence in the T direction and form a spiral along the T direction. The first extended conductive layers 61 are exposed through the first end surface 15 of the element 10 and are connected to the first outer electrode 31. The second extended conductive layers 62 are exposed through the second end surface 16 of the element 10 and are connected to the second outer electrode 32. The number of each of the first and second extended conductive layers 61 and 62 is not limited to any particular one, and the number of each of them may be one.

Each of the coil conductive layers 21 has a shape wound less than about one turn on a plane. Each of the extended conductive layers 61 and 62 has a substantially linear shape. One example thickness of the coil conductive layer 21 may be not less than about 10 μm and not more than about 40 μm (i.e., from about 10 μm to about 40 μm). One example thickness of each of the extended conductive layers 61 and 62 may be about 30 μm. Each of the first and second extended conductive layers 61 and 62 may be thinner than the coil conductive layer 21.

The coil conductive layer 21 is disposed between the first magnetic layer 11 and the second magnetic layer 12. FIG. 3 illustrates each second magnetic layer 12 by a hatch pattern for facilitating the understanding. The first magnetic layer 11 is positioned below the coil conductive layer 21 in the T direction. The second magnetic layer 12 is positioned above the coil conductive layer 21 in the T direction. Because the coil conductive layer 21 is disposed between the first and second magnetic layers 11 and 12, the shape of the coil conductive layer 21 in a cross section substantially orthogonal to the direction in which the coil conductive layer 21 extends (winding direction) is a substantially oval.

Each of the first and second extended conductive layers 61 and 62 is disposed on a layer different from the layer on which the coil conductive layer 21 is disposed. Each of the first and second extended conductive layers 61 and 62 is disposed between two of the second magnetic layers 12.

Voids 51 are present inside the element 10. The voids 51 are omitted in FIG. 3. Each of the voids 51 is positioned between the second magnetic layer 12 and the coil conductive layer 21. The void 51 is in contact with the upper surface of the coil conductive layer 21. The void 51 is disposed over the entire interface between the coil conductive layer 21 and second magnetic layer 12. The void 51 may also be partially disposed along a portion of that interface. The thickness of the void 51 may be fixed or vary. One example of the maximum thickness of the void 51 may be not less than about 0.5 μm and not more than about 8 μm (i.e., from about 0.5 μm to about 8 μm).

The presence of the void 51 can suppress stress on the magnetic layers 11 and 12 caused by temperature changes in the coil conductive layer 21 arising from a difference in thermal expansion coefficient between the coil conductive layer 21 and the magnetic layers 11 and 12. Consequently, degradation in inductance and impedance characteristics caused by internal stress can be avoided.

Figure 4:
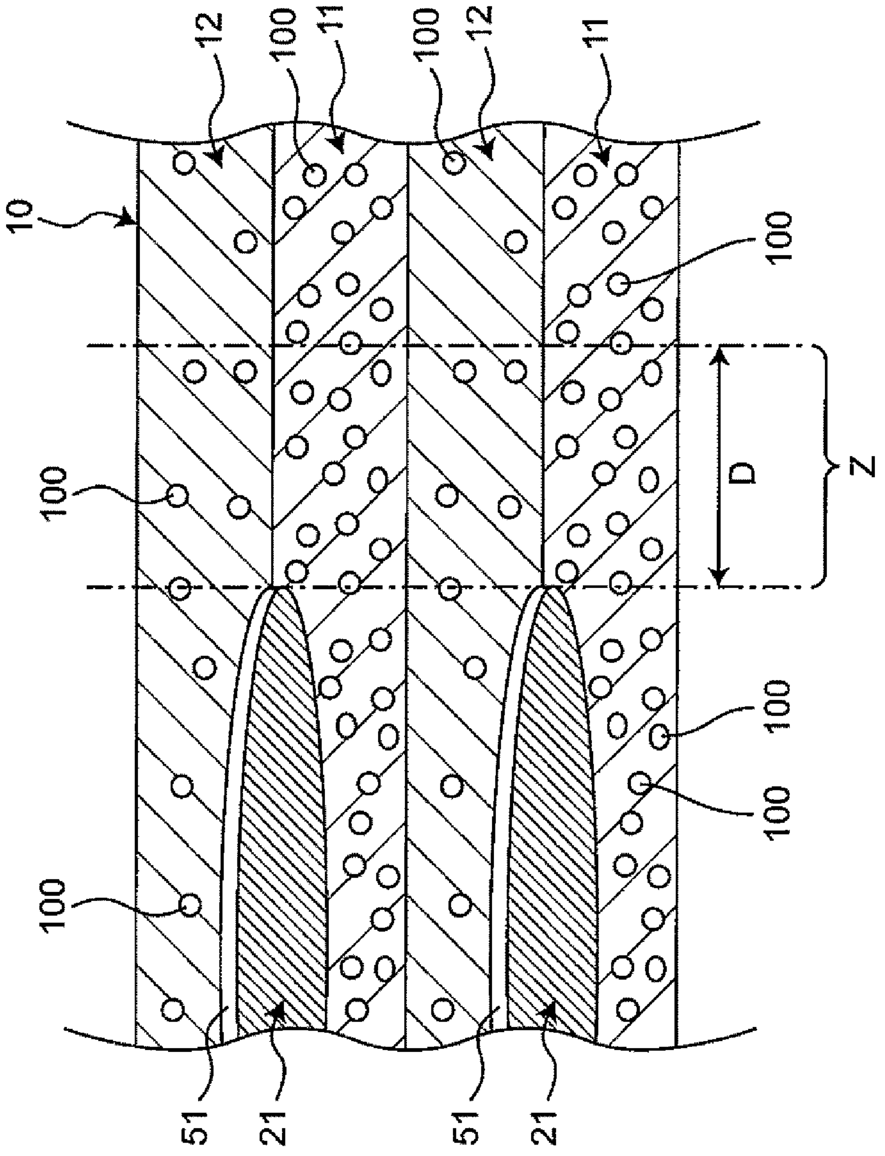
FIG. 4 is an enlarged cross-sectional view of coil conductive layers and their surroundings.

FIG. 4 is an enlarged cross-sectional view of the coil conductive layers 21 and their surroundings in FIG. 2. FIG. 4 illustrates a cross section along the width direction of the coil conductive layers 21, in other words, illustrates a cross section substantially orthogonal to the direction in which the coil conductive layers 21 extend.

As illustrated in FIG. 4, the pore area proportion in the second magnetic layers 12 is smaller than that in the first magnetic layers 11. Here, the pore area proportion indicates the proportion of the area of pores (cavities) 100 per unit area in a predetermined region at a cross section of the element 10. Specifically, a cross section used in measuring the pore area proportion is an LT plane in the coil component 1 and is also a plane that passes through the substantially center of the coil component 1 in the W direction.

The pore area proportion is measured as described below. A cross section that is an LT plane of the coil component 1 and that passes through the substantially center of the coil component 1 in the W direction is subjected to focused ion-beam processing (FIB processing). In the FIB processing, a measurement specimen is set in an upright position, and if needed, the surroundings of the specimen are solidified with resin. The measurement LT-plane cross section is obtainable by grinding the specimen by a grinder to a depth at which the substantially central portion in the W direction of the specimen is exposed in the W direction. Here, the FIB processing is performed by using an FIB processing device SM13050R (SII Nanotechnology Inc.). After that, an image at the obtained cross section is captured by a scanning electron microscope (SEM). The captured SEM image is analyzed by using image analysis software, and the pore area proportion is determined. As the image analysis software, A-ZO-Kun (registered trademark) manufactured by Asahi Kasei Engineering Corporation is used.

Specifically, a zone from the end portion of the coil conductive layer 21 to a position distant toward the outer side portion of the element 10 by a distance D (e.g., about 50 μm) is a measurement zone Z. In the measurement zone Z, the first magnetic layer 11 with a large pore area proportion and the second magnetic layer 12 with a small pore area proportion are detected by the SEM. Then, an image of a zone of about 20 μm by about 20 μm at the substantially center of each of the magnetic layers 11 and 12 in the thickness direction is captured by the SEM, and the pore area proportion in each of the first magnetic layer 11 and the second magnetic layer 12 is determined by image analysis.

In the above-described coil component 1, the pores 100 in the magnetic layers 11 and 12 may be formed by, for example, firing a binder contained in the material of each of the magnetic layers 11 and 12. That is, the pore area proportion increases with an increase in the amount of the binder. Because the binder contributes to enhancing the adhesion, when the coil conductive layer 21 is placed between the first magnetic layer 11 and the second magnetic layer 12 before the element 10 (magnetic layers 11 and 12) and the coil conductive layer 21 are fired in the process for manufacturing the coil component 1, the adhesion between the second magnetic layer 12 with the small amount of the binder (small pore area proportion) and the coil conductive layer 21 is lower than the adhesion between the first magnetic layer 11 with the large amount of the binder (large pore area proportion) and the coil conductive layer 21.

After that, when the element 10 and the coil conductive layer 21 are fired, the binder is being lost, and the formation of the pores 100 begins and continues. At that time, the adhesion is being reduced by the loss of the binder, and the coil conductive layer 21 starts shrinking from its portion in contact with the second magnetic layer 12 (i.e., upper surface portion), which is a portion with low adhesion. Consequently, the voids 51 are formed between the coil conductive layer 21 and the second magnetic layer 12.

Accordingly, unlike in known cases, the voids 51 can be formed between the second magnetic layer 12 and coil conductive layer 21 without additional application of paste for forming voids to the coil conductive layer, and the voids 51 can be readily formed.

As described above, the present disclosure focuses on the imbalance between the adhesion of the first magnetic layer 11 to the coil conductive layer 21 and that of the second magnetic layer 12 to the coil conductive layer 21, the first magnetic layer 11 and second magnetic layer 12 being positioned on the opposite sides of the coil conductive layer 21, and finds that the voids 51 are formed on the side where the adhesion to the coil conductive layer 21 is lower.

In the above-described coil component 1, because the first and second extended conductive layers 61 and 62 are disposed on layers different from the layer on which the coil conductive layer 21 is disposed, the first and second extended conductive layers 61 and 62 are not in contact with the voids 51. Thus, the voids 51 do not communicate with the outside of the element 10, and entry of plating solution or other matter from the outside of the element 10 can be prevented. Accordingly, electrochemical migration in the first and second extended conductive layers 61 and 62 or the coil conductive layer 21 can be prevented.

In the above-described coil component 1, because each of the first and second extended conductive layers 61 and 62 is disposed between two of the second magnetic layers 12, the number of the pores 100 around the first and second extended conductive layers 61 and 62 is small. Thus, the pores 100 do not communicate with the outside of the element 10, and entry of plating solution into the element 10 from the outside can be further prevented. Because each of the extended conductive layers 61 and 62 is disposed between the second magnetic layers 12 of the same kind, there is no difference in the adhesion between the opposite surfaces of each of the extended conductive layers 61 and 62, and the voids 51 are less prone to open on the opposite surfaces of each of the extended conductive layers 61 and 62.

Preferably, the difference between the pore area proportion in the first magnetic layers 11 and that in the second magnetic layers 12 may be about 2% or more. In that case, the adhesion between the coil conductive layer 21 and the corresponding second magnetic layer 12 can be smaller than that between the coil conductive layer 21 and the corresponding first magnetic layer 11 with reliability, and the voids 51 can be formed more readily.

Preferably, the difference between the pore area proportion in the first magnetic layers 11 and that in the second magnetic layers 12 may be 5% or more. In that case, the adhesion between the coil conductive layer 21 and the corresponding second magnetic layer 12 can be smaller than that between the coil conductive layer 21 and the corresponding first magnetic layer 11 with reliability, and the voids 51 can be formed more readily.

Preferably, the pore area proportion in the second magnetic layers 12 may be not less than about 1% and not more than about 5% (i.e., from about 1% to about 5%). Preferably, the pore area proportion in the first magnetic layers 11 may be not less than about 5% and not more than about 15% (i.e., from about 5% to about 15%).

The size of each of the pores 100 is not limited to any particular one. One example size may be about 0.5 μm or less, specifically about 0.4 μm or less. One example lower limit of the size of the pore 100 may be about 0.05 μm. The mean grain size of the pores 100 is not limited to any particular one. One example mean grain size may be not less than about 0.1 μm and not more than about 0.3 μm (i.e., from about 0.1 μm to about 0.3 μm).

The shape of each of the pores 100 is not limited to any particular one. Examples of its cross-sectional shape may be substantially circular, substantially oval, and substantially polygonal.

Next, one example method for manufacturing the coil component 1 is described by using FIGS. 2 and 3.

First, green sheets to become the first magnetic layers 11 and second magnetic layers 12 are prepared. Examples of the green sheets to become the first and second magnetic layers 11 and 12 may be produced by shaping magnetic slurry containing a magnetic ferrite material into sheets and then as needed processing, such as punching, them.

One example method for processing the magnetic slurry into the shape of sheets may be the doctor blade method. An example thickness of the obtainable sheet in that method may be not less than about 15 μm and not more than about 25 μm (i.e., from about 15 μm to about 25 μm).

The composition of the magnetic ferrite material is not limited to any particular one. The magnetic ferrite material may contain, for example, iron(III) oxide ($Fe_2O_3$), zinc oxide (ZnO), copper(II) oxide (CuO), and nickel(II) oxide (NiO). When the magnetic ferrite material contains $Fe_2O_3$, ZnO, CuO, and NiO, example contents of them may be as follows: the content of $Fe_2O_3$ is not less than about 40.0 mol % and not more than about 49.5 mol % (i.e., from about 40.0 mol % to about 49.5 mol %); that of ZnO is not less than about 5 mol % and not more than about 35 mol % (i.e., from about 5 mol % to about 35 mol %); that of CuO is not less than about 8 mol % and not more than about 12 mol % (i.e., from about 8 mol % to about 12 mol %); and that of NiO is not less than about 8 mol % and not more than about 40 mol % (i.e., from about 8 mol % to about 40 mol %). The magnetic ferrite material may further contain an additive. Examples of the additive may include manganese(II,III) oxide ($Mn_3O_4$), cobalt(II,III) oxide ($Co_3O_4$), tin(IV) oxide ($SnO_2$), bismuth(III) oxide ($Bi_2O_3$), and silicon dioxide ($SiO_2$).

The magnetic ferrite material is mixed and ground in a wet process using a normally performable method, and then, it is dried. The mixture resulting from the drying is calcinated at temperatures not lower than about 700° C. and not higher than about 800° C. (i.e., from about 700° C. to about 800° C.), and raw material powder is formed. The raw material powder (calcinated powder) may contain unavoidable impurities.

A water-based acrylic binder and a dispersant are added to the raw material powder, they are mixed and ground in a wet process, and magnetic slurry is produced. The mixing and grinding in the wet processing can be performed, for example, inside a pot mill in which a partially stabilized zirconia (PSZ) ball is also placed.

As the green sheet to become each of the first magnetic layers 11, a green sheet in which the amount of the binder added is larger than that in each of the second magnetic layers 12 is used. In one example, the amount of the binder based on about 100 weight parts of the raw material powder may be not less than about 35 parts by weight and not more than about 40 parts by weight (i.e., from about 35 parts by weight to about 40 parts by weight). A relatively large amount of the binder results in a relatively large pore area proportion after firing. As the binder, publicly known resin materials, including polyvinyl butyral resin, polyvinyl alcohol resin, and acrylic resin, can be used.

As the green sheet to become the second magnetic layer 12, a green sheet in which the amount of the binder added is smaller than that in the first magnetic layer 11 is used. In one example, the amount of the binder based on about 100 weight parts of the raw material powder may be not less than about 25 parts by weight and not more than about 30 parts by weight (i.e., from about 25 parts by weight to about 30 parts by weight). A relatively small amount of the binder results in a relatively small pore area proportion after firing.

After that, through holes are formed by radiating predetermined locations in the green sheets for the first magnetic layers 11 and the green sheets for the second magnetic layers 12 with laser light. Then, screen-printing of silver paste is performed, thereby filling the through holes with silver paste and forming via conductors, and the coil conductive layers 21 and the extended conductive layers 61 and 62 are formed. They are stacked in the order illustrated in FIG. 3 and are joined by thermocompression bonding, and thus a multilayer block is produced.

At that time, as the green sheets on the opposite sides of each of the coil conductive layers 21, one is the green sheet for the first magnetic layer 11 (with a relatively large amount of the binder), and the other is the green sheet for the second magnetic layer 12 (with a relatively small amount of the binder). When the binder is removed from the sheets in firing, the adhesion between the coil conductive layer 21 and each of the sheets decreases. Accordingly, because the coil conductive layer 21 is positioned between the sheet with less binder and the sheet with much binder, the binder in the sheet with less binder is removed faster, and its adhesion relatively decreases. Therefore, when there is a difference in the adhesion to the coil conductive layer 21, the voids 51 can be formed on the side where the adhesion to the coil conductive layer 21 is low.

Each of the extended conductive layers 61 and 62 is positioned between the green sheets for the second magnetic layers 12. Thus, the adhesion is substantially the same on its opposite sides, and the voids 51 are less prone to open. In addition, because the green sheets for the second magnetic layers 12 are used, the number of the pores 100 in contact with the extended conductive layers 61 and 62 can be small. Each of the extended conductive layers 61 and 62 may be positioned between the green sheets for the first magnetic layers 11. Even in that case, the adhesion is substantially the same on its opposite sides, and the voids 51 are less prone to open.

After that, normally performable operations for the formed multilayer block, for example, dividing into pieces, firing, and forming outer electrodes, are carried out, and the coil components 1 are formed. The dividing into pieces, firing, and forming outer electrodes can be carried out by using normally performable methods. For example, the dividing into pieces can be carried out by cutting the obtained multilayer block with a tool, such as a dicer. The corners or other areas of the pieces may be rounded by using a rotational barrel if needed. The firing can be carried out at temperatures not lower than about 880° C. and not higher than about 920° C. (i.e., from about 880° C. to about 920° C.). The outer electrodes 31 and 32 can be formed by immersing the end surfaces through which the extended conductive layers 61 and 62 are exposed in a layer in which silver paste is extended to a predetermined thickness, baking them at temperatures on the order of about 800° C., thus forming base electrodes, and then, sequentially forming a nickel film and a tin film on the base electrodes by electrolytic plating. In one example of the coil components 1 manufactured in that way, the pore area proportion in the first magnetic layers 11 is about 8.9%, and the pore area proportion in the second magnetic layers 12 is about 1.5%.

Second Embodiment

Figure 5:
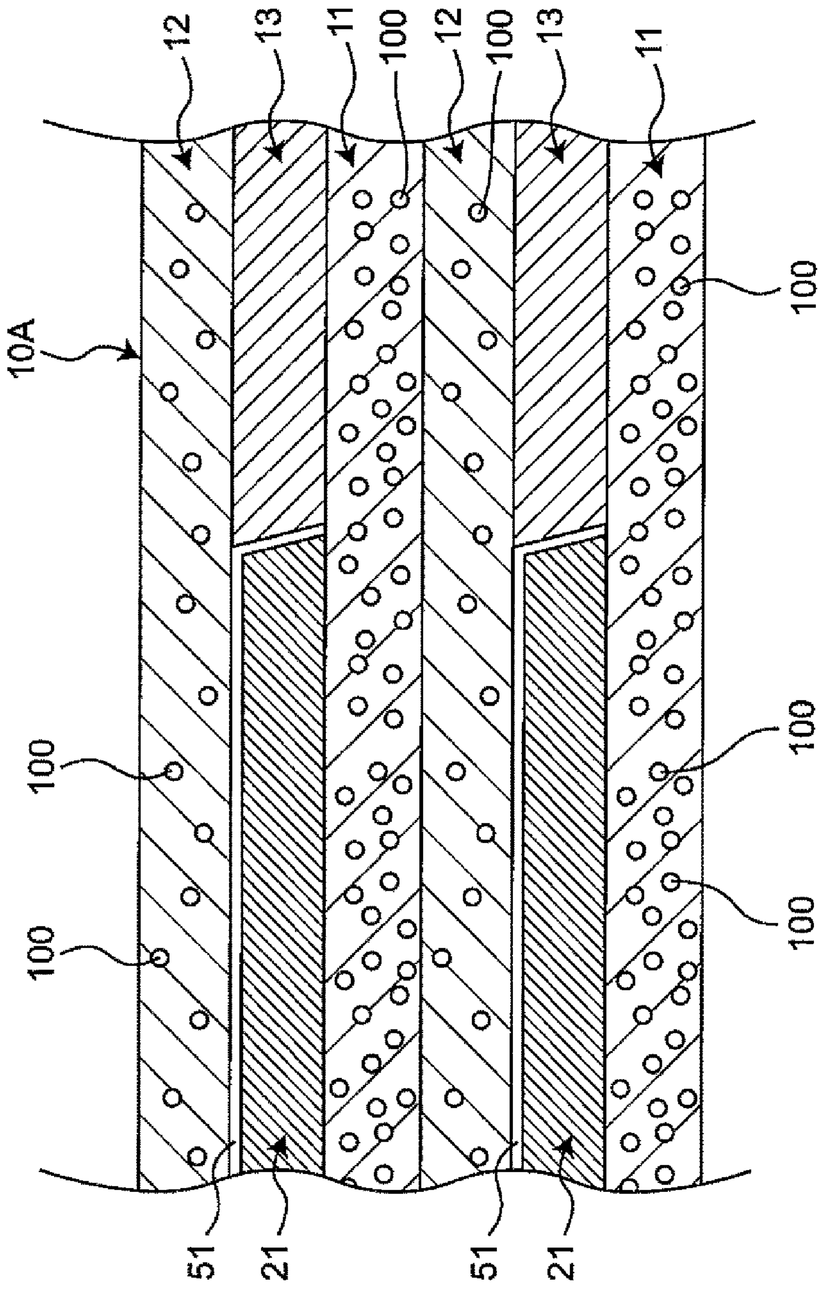
FIG. 5 illustrates a coil component according to a second embodiment and is an enlarged cross-sectional view of coil conductive layers and their surroundings.

FIG. 5 is an enlarged cross-sectional view that illustrates a coil component according to a second embodiment. The second embodiment differs from the first embodiment (FIG. 4) in the configuration of the element. That different configuration is described below. The other configuration is substantially the same as that in the first embodiment, the same reference numerals as those in the first embodiment are used, and the description is omitted.

As illustrated in FIG. 5, an element 10A in the coil component according to the second embodiment includes, in addition to the first magnetic layers 11 and second magnetic layers 12, third magnetic layers 13. Each of the third magnetic layers 13 is disposed on the corresponding first magnetic layer 11, which is the same layer on which the coil conductive layer 21 is disposed. That is, the third magnetic layer 13 is disposed on the first magnetic layer 11 in a region where the coil conductive layer 21 is not disposed. The third magnetic layer 13 is made of a material the same as or similar to that of the first magnetic layer 11 or second magnetic layer 12. The pore area proportion in the third magnetic layers 13 may be larger than or smaller than the pore area proportion in each of the first magnetic layers 11 and second magnetic layers 12. In FIG. 5, the pores in the third magnetic layer 13 are omitted.

Because the third magnetic layer 13 and the coil conductive layer 21 are disposed on the same layer, it is ensured that the coil conductive layer 21 has a sufficient thickness, and the direct current resistance value (Rdc) of the coil conductive layer 21 can be reduced.

When the pore area proportion in the third magnetic layers 13 is smaller than that in the first magnetic layers 11, the voids 51 can be formed between the side surface of the coil conductive layer 21 and the corresponding third magnetic layer 13. When the pore area proportion in the third magnetic layers 13 is larger than that in the second magnetic layers 12, the adhesion between the side surface of the coil conductive layer 21 and the corresponding third magnetic layer 13 can be increased.

Third Embodiment

Figure 6:
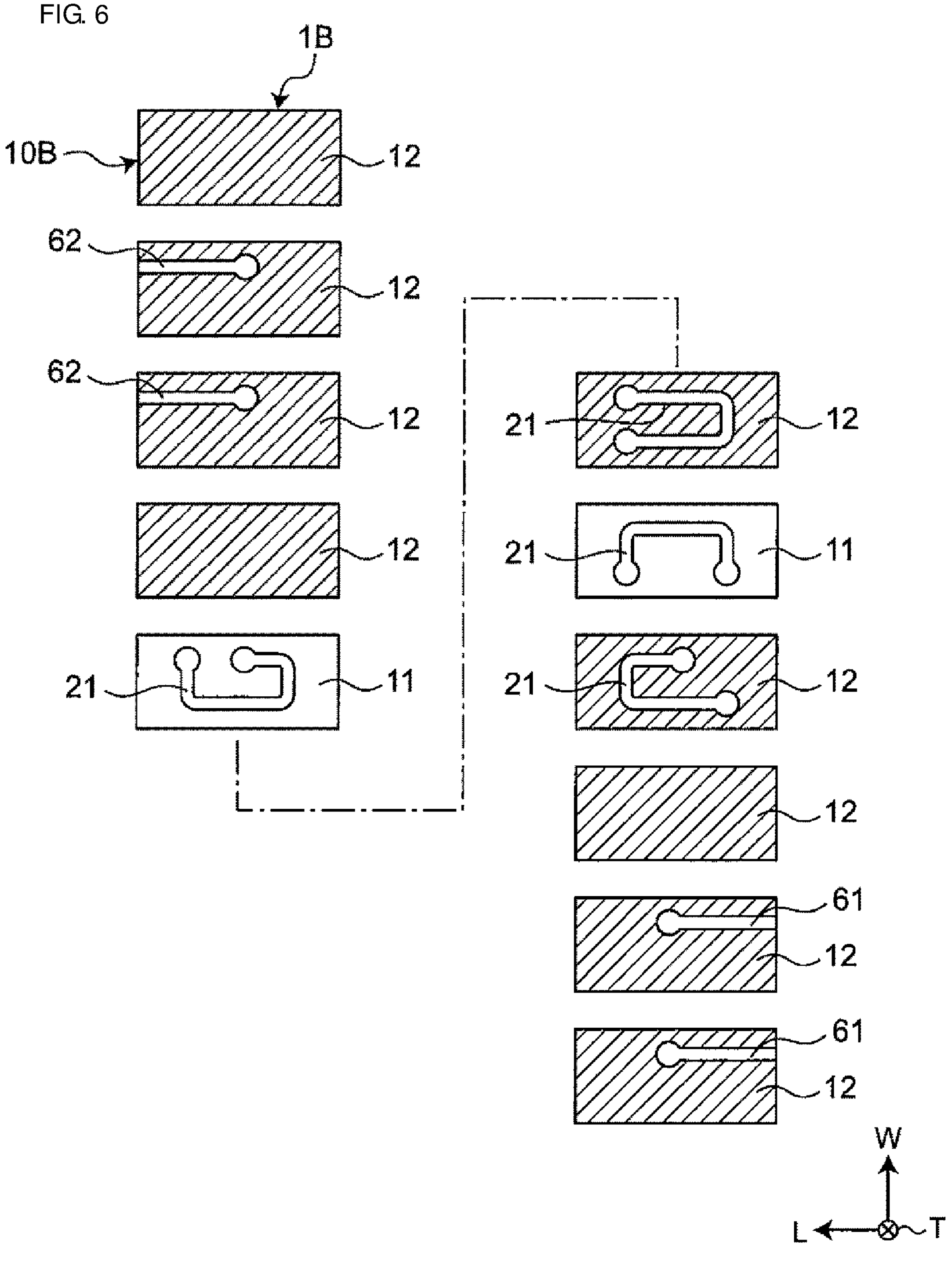
FIG. 6 is an exploded plan view that illustrates a coil component according to a third embodiment.
Figure 7:
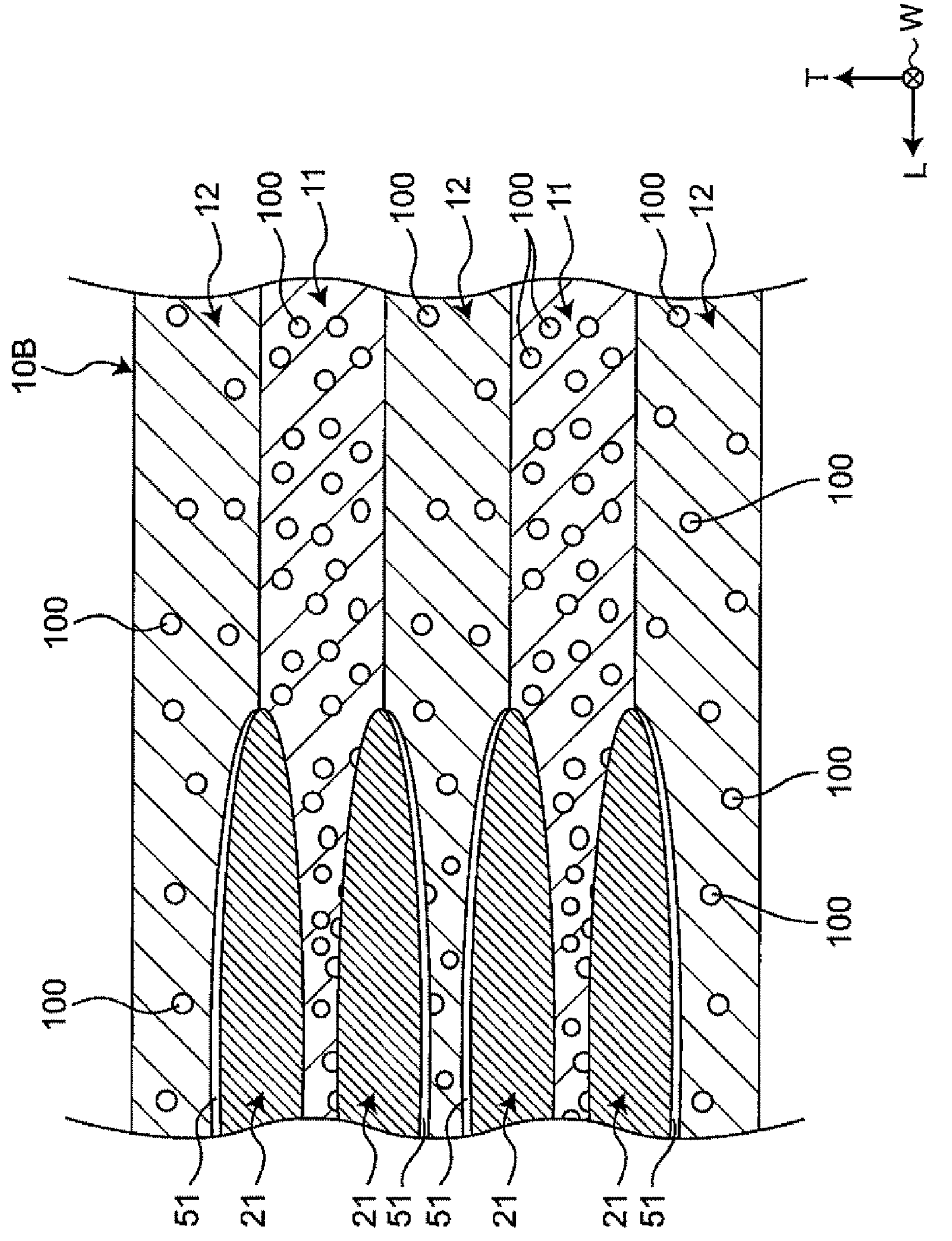
FIG. 7 is an enlarged cross-sectional view that illustrates the coil component according to the third embodiment.

FIG. 6 is an exploded plan view that illustrates a coil component according to a third embodiment. FIG. 7 is an enlarged cross-sectional view that illustrates the coil component according to the third embodiment. The third embodiment differs from the first embodiment (FIGS. 3 and 4) in the positions of the coil conductive layers in the element. That different configuration is described below. The other configuration is substantially the same as that in the first embodiment, the same reference numerals as those in the first embodiment are used, and the description is omitted.

As illustrated in FIGS. 6 and 7, an element 10B in a coil component 1B according to the third embodiment alternately includes the second magnetic layers 12 and first magnetic layers 11 along the T direction. Specifically, the second magnetic layer 12 as the first layer, the first magnetic layer 11 as the second layer, the second magnetic layer 12 as the third layer, the first magnetic layer 11 as the fourth layer, and the second magnetic layer 12 as the fifth layer are arranged in sequence along the T direction. The first coil conductive layer 21, the second coil conductive layer 21, the third coil conductive layer 21, and the fourth coil conductive layer 21 are arranged in sequence along the T direction.

The first coil conductive layer 21 is arranged between the second magnetic layer 12 as the first layer and the first magnetic layer 11 as the second layer. The second coil conductive layer 21 is arranged between the first magnetic layer 11 as the second layer and the second magnetic layer 12 as the third layer. The third coil conductive layer 21 is arranged between the second magnetic layer 12 as the third layer and the first magnetic layer 11 as the fourth layer. The fourth coil conductive layer 21 is arranged between the first magnetic layer 11 as the fourth layer and the second magnetic layer 12 as the fifth layer.

The void 51 is disposed between the second magnetic layer 12 as the first layer and the first coil conductive layer 21. Another void 51 is disposed between the second magnetic layer 12 as the third layer and the second coil conductive layer 21. Another void 51 is disposed between the second magnetic layer 12 as the third layer and the third coil conductive layer 21. Another void 51 is disposed between the second magnetic layer 12 as the fifth layer and the fourth coil conductive layer 21. In this way, the voids 51 are positioned alternately above and below the coil conductive layers 21 along the T direction.

A method for manufacturing the coil component 1B is described below. Of green sheets on which coil conductive layers are to be printed, green sheets to become the first magnetic layers and green sheets to become the second magnetic layers are alternately laminated in sequence, and they are fired. In this way, the voids are formed, and the coil component 1B is manufactured.

In the coil component 1B, in addition to the advantages in the first embodiment, the number of each of the first and second magnetic layers can be reduced.

The present disclosure is not limited to the above-described embodiments and can be changed in design within a range that does not depart from the spirit of the present disclosure. For example, the features in the first to third embodiments may be combined in various ways.

In the first and second embodiments, the first magnetic layer 11 is arranged on the lower surface of the coil conductive layer 21, and the second magnetic layer 12 is arranged on the upper surface of the coil conductive layer 21. Alternatively, the second magnetic layer 12 may be arranged on the lower surface of the coil conductive layer 21, and the first magnetic layer 11 may be arranged on the upper surface of the coil conductive layer 21. In that case, the void 51 is formed between the lower surface of the coil conductive layer 21 and the second magnetic layer 12.

In the first to third embodiments, each of the extended conductive layers 61 and 62 is disposed between the second magnetic layers 12. Alternatively, each of the extended conductive layers 61 and 62 may be disposed between the first magnetic layers 11. Even in that case, the adhesion is substantially the same on the opposite sides of each of the extended conductive layers 61 and 62, and the voids 51 are less prone to open on the opposite sides of each of the extended conductive layers 61 and 62.

In the first to third embodiments, the void 51 is formed between the coil conductive layer 21 and the second magnetic layer 12. In addition, the void 51 may be partially formed between the coil conductive layer 21 and the first magnetic layer 11.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
an element including a plurality of first magnetic layers and second magnetic layers laminated; and
a coil disposed in the element, the coil including a plurality of coil conductive layers laminated,
wherein
each of the coil conductive layers is disposed between a corresponding one of the first magnetic layers and a corresponding one of the second magnetic layers,
a pore area proportion in the second magnetic layers is smaller than a pore area proportion in the first magnetic layers,
a void is present between an interface of at least one of the coil conductive layers and the corresponding one of the second magnetic layers,
the at least one of the coil conductive layers is directly adjacent to the void and is directly adjacent to the corresponding one of the first magnetic layers,
the first magnetic layers and the second magnetic layers are alternately laminated, and
the corresponding one of the first magnetic layers and the corresponding one of the second magnetic layers are disposed between one of the coil conductive layers and another one of the conductive layers.

2. The coil component according to claim 1, wherein
a difference between the pore area proportion in the first magnetic layers and the pore area proportion in the second magnetic layers is 2% or more.

3. The coil component according to claim 2, wherein
the difference between the pore area proportion in the first magnetic layers and the pore area proportion in the second magnetic layers is 5% or more.

4. The coil component according to claim 1, wherein
the pore area proportion in the second magnetic layers is from 1% to 5%.

5. The coil component according to claim 1, wherein
the pore area proportion in the first magnetic layers is from 5% to 15%.

6. The coil component according to claim 1, further comprising
an outer electrode disposed on a surface of the element and electrically connected to the coil,
wherein
the coil includes an extended conductive layer electrically connected to at least one of the coil conductive layers, exposed through the surface of the element, and connected to the outer electrode, and
the extended conductive layer is disposed on a layer different from the at least one of the coil conductive layers.

7. The coil component according to claim 6, wherein
the extended conductive layer is disposed between two of the second magnetic layers.

8. The coil component according to claim 2, wherein
the pore area proportion in the second magnetic layers is from 1% to 5%.

9. The coil component according to claim 3, wherein
the pore area proportion in the second magnetic layers is from 1% to 5%.

10. The coil component according to claim 2, wherein
the pore area proportion in the first magnetic layers is from 5% to 15%.

11. The coil component according to claim 3, wherein
the pore area proportion in the first magnetic layers is from 5% to 15%.

12. The coil component according to claim 4, wherein
the pore area proportion in the first magnetic layers is from 5% to 15%.

13. The coil component according to claim 8, wherein
the pore area proportion in the first magnetic layers is from 5% to 15%.

14. The coil component according to claim 9, wherein
the pore area proportion in the first magnetic layers is from 5% to 15%.

15. The coil component according to claim 2, further comprising
an outer electrode disposed on a surface of the element and electrically connected to the coil,
wherein
the coil includes an extended conductive layer electrically connected to at least one of the coil conductive layers, exposed through the surface of the element, and connected to the outer electrode, and
the extended conductive layer is disposed on a layer different from the at least one of the coil conductive layers.

16. The coil component according to claim 3, further comprising
an outer electrode disposed on a surface of the element and electrically connected to the coil,
wherein
the coil includes an extended conductive layer electrically connected to at least one of the coil conductive layers, exposed through the surface of the element, and connected to the outer electrode, and
the extended conductive layer is disposed on a layer different from the at least one of the coil conductive layers.

17. The coil component according to claim 4, further comprising an outer electrode disposed on a surface of the element and electrically connected to the coil, wherein the coil includes an extended conductive layer electrically connected to at least one of the coil conductive layers, exposed through the surface of the element, and connected to the outer electrode, and the extended conductive layer is disposed on a layer different from the at least one of the coil conductive layers.

18. The coil component according to claim 5, further comprising an outer electrode disposed on a surface of the element and electrically connected to the coil, wherein the coil includes an extended conductive layer electrically connected to at least one of the coil conductive layers, exposed through the surface of the element, and connected to the outer electrode, and the extended conductive layer is disposed on a layer different from the at least one of the coil conductive layers.

19. The coil component according to claim 8, further comprising an outer electrode disposed on a surface of the element and electrically connected to the coil, wherein the coil includes an extended conductive layer electrically connected to at least one of the coil conductive layers, exposed through the surface of the element, and connected to the outer electrode, and the extended conductive layer is disposed on a layer different from the at least one of the coil conductive layers.

20. The coil component according to claim 9, further comprising an outer electrode disposed on a surface of the element and electrically connected to the coil, wherein the coil includes an extended conductive layer electrically connected to at least one of the coil conductive layers, exposed through the surface of the element, and connected to the outer electrode, and the extended conductive layer is disposed on a layer different from the at least one of the coil conductive layers.

* * * * *